US012760574B2

(12) United States Patent
Göpfert et al.

(10) Patent No.: US 12,760,574 B2
(45) Date of Patent: Oct. 13, 2026

(54) ACTUATING MECHANISM FOR ACTUATING COVERS FOR VEHICLES

(71) Applicant: Illinois Tool Works Inc., Glenview, IL (US)

(72) Inventors: Tobias Göpfert, Würzburg (DE); Matthias Hegwein, Ippesheim (DE); Thomas Lechner-Watzlik, Aub (DE); Joachim Oberst, Großrinderfeld (DE); Roland Och, Rottendorf (DE)

(73) Assignee: Illinois Tool Works Inc., Glenview, IL (US)

( * ) Notice: Subject to any disclaimer, the term of this patent is extended or adjusted under 35 U.S.C. 154(b) by 456 days.

(21) Appl. No.: 18/228,977

(22) Filed: Aug. 1, 2023

(65) Prior Publication Data

US 2024/0060343 A1 Feb. 22, 2024

(30) Foreign Application Priority Data

Aug. 17, 2022 (DE) ..................... 10 2022 120 728.5

(51) Int. Cl.
*E05D 15/58* (2006.01)
*B60K 15/05* (2006.01)
(Continued)

(52) U.S. Cl.
CPC ............ *E05D 15/582* (2013.01); *E05B 83/34* (2013.01); *E05F 15/603* (2015.01); *B60K 15/05* (2013.01);
(Continued)

(58) Field of Classification Search
CPC .............. B60K 15/05; B60K 2015/053; B60K 2015/0538; E05D 15/582; E05D 3/022;
(Continued)

(56) References Cited

U.S. PATENT DOCUMENTS 681,075 A 8/1901 Perkins
4,867,501 A 9/1989 Nomura
(Continued)

FOREIGN PATENT DOCUMENTS

CN 203503887 U * 3/2014 ............. Y04S 30/12
CN 105936304 A * 9/2016 ............. B62D 25/24
(Continued)

*Primary Examiner* — Steven A Tullia
(74) *Attorney, Agent, or Firm* — McAndrews, Held & Malloy, Ltd.

(57) ABSTRACT

The present disclosure relates to an actuating mechanism (100) for actuating covers (102) for vehicles. The actuation mechanism (110) includes: a drive having a drive shaft; and at least one lever arm (101), which is connectable to the cover (102) and is configured so as to tap a rotational movement from the drive shaft when the drive is actuated and convert it into a movement of the cover (102). The lever arm (101) includes a drive surface (111), which communicates with the drive shaft such that a rotation of the drive shaft via the drive surface (111) is transferred to the lever arm (101). The drive surface (111) includes a first region (112) where a rotation of the drive shaft moves the lever arm in a first direction when the lever arm is in communication with the drive shaft via the first region (112), and wherein the drive surface (111) includes a second region (114) configured such that a rotation of the drive shaft moves the lever arm in a second direction when the lever arm communicates with the drive shaft via the second region (114).

20 Claims, 4 Drawing Sheets

(51) Int. Cl.
*E05B 83/34* (2014.01)
*E05F 15/603* (2015.01)

(52) U.S. Cl.
CPC ... *B60K 2015/053* (2013.01); *E05Y 2201/626* (2013.01); *E05Y 2201/722* (2013.01); *E05Y 2900/534* (2013.01)

(58) Field of Classification Search
CPC ....... E05F 15/603; E05F 15/619; E05F 15/63; E05Y 2201/626; E05Y 2201/722; E05Y 2201/534; E05Y 2201/24; E05Y 2201/638; E05Y 2201/682; E05Y 2201/296; E05Y 2201/53; Y10T 292/0923; Y10T 292/0916; Y10T 292/0918; Y10T 292/694; E05C 3/00; E05C 3/16; E05C 3/122; E05C 3/162; E05C 3/165; E05B 79/06; E05B 85/10; E05B 85/103; E05B 85/14; E05B 85/18; E05B 17/042; E05B 83/28; E05B 83/34
See application file for complete search history.

(56) References Cited

U.S. PATENT DOCUMENTS

| | | | | |
|---|---|---|---|---|
| 6,923,481 | B2 | 8/2005 | Bruderick | |
| 7,062,945 | B2 | 6/2006 | Saitoh | |
| 7,404,588 | B2 | 7/2008 | Gabsch | |
| 7,621,573 | B2 | 11/2009 | Thomas | |
| 8,089,228 | B2 | 1/2012 | Ballard | |
| 8,439,421 | B2 * | 5/2013 | Mihai | B60K 15/05 296/97.22 |
| 8,443,553 | B1 | 5/2013 | Polewarczyk | |
| 8,820,561 | B2 * | 9/2014 | Bauer | B60K 15/0406 220/264 |
| 8,905,458 | B2 * | 12/2014 | Pipp | B60K 15/05 141/94 |
| 9,062,478 | B2 | 6/2015 | Bingle | |
| 9,156,335 | B1 | 10/2015 | Harter | |
| 9,458,649 | B2 | 10/2016 | Fujiwara | |
| 9,643,487 | B2 | 5/2017 | Szawarski | |
| D806,513 | S | 1/2018 | Curic | |
| 10,052,947 | B2 | 8/2018 | Herrmann | |
| 10,053,893 | B1 | 8/2018 | Patel | |
| 10,253,533 | B1 | 4/2019 | Pudney | |
| 10,435,924 | B1 | 10/2019 | Salter | |
| 10,577,845 | B2 | 3/2020 | Herczeg | |
| 10,615,534 | B2 | 4/2020 | Herczeg | |
| 10,655,371 | B2 | 5/2020 | Soonthornwinate | |
| 10,711,494 | B2 | 7/2020 | Bingle | |
| 10,760,307 | B2 | 9/2020 | Rocci | |
| 10,934,748 | B2 | 3/2021 | Harajli | |
| 10,941,603 | B2 | 3/2021 | Linden | |
| 10,988,962 | B2 | 4/2021 | Park | |
| 11,027,646 | B2 | 6/2021 | Kothe | |
| 11,040,615 | B2 | 6/2021 | Herzig | |
| 11,085,212 | B2 | 8/2021 | Rivaya | |
| 11,248,403 | B2 | 2/2022 | Boberschmidt | |
| 11,479,995 | B2 | 10/2022 | Matthias | |
| 11,560,741 | B2 | 1/2023 | Guerin | |
| 11,821,245 | B2 | 11/2023 | Herdering | |
| 12,152,421 | B2 * | 11/2024 | Hegwein | B60K 15/05 |
| 2004/0177478 | A1 | 9/2004 | Louvel | |
| 2005/0121924 | A1 | 6/2005 | Chanya | |
| 2006/0279095 | A1 | 12/2006 | Ishiguro | |
| 2008/0163555 | A1 | 7/2008 | Thomas | |
| 2009/0058132 | A1 | 3/2009 | Browne | |
| 2013/0079984 | A1 | 3/2013 | Aerts | |
| 2013/0127185 | A1 | 5/2013 | Lang | |
| 2014/0000167 | A1 | 1/2014 | Patel | |
| 2014/0047877 | A1 | 2/2014 | Guenther | |
| 2014/0300115 | A1 | 10/2014 | Vasi | |
| 2015/0048644 | A1 | 2/2015 | Georgi | |
| 2015/0315812 | A1 | 11/2015 | Vasi | |
| 2016/0010369 | A1 | 1/2016 | Specht | |
| 2016/0208523 | A1 | 7/2016 | Bingle | |
| 2017/0066312 | A1 | 3/2017 | Coutier | |
| 2018/0163442 | A1 | 6/2018 | Soonthornwinate | |
| 2019/0078360 | A1 | 3/2019 | Blount | |
| 2019/0100948 | A1 | 4/2019 | Low | |
| 2019/0112842 | A1 | 4/2019 | Wilke | |
| 2019/0112846 | A1 | 4/2019 | Laval | |
| 2019/0234121 | A1 | 8/2019 | Pudney | |
| 2019/0368239 | A1 | 12/2019 | Rhein | |
| 2020/0308883 | A1 | 10/2020 | Bresser | |
| 2020/0332575 | A1 | 10/2020 | Christensen | |
| 2020/0362604 | A1 | 11/2020 | Jarnicki | |
| 2021/0062558 | A1 | 3/2021 | Beck | |
| 2021/0332619 | A1 | 10/2021 | Peterson | |
| 2022/0042356 | A1 | 2/2022 | Herdering | |
| 2022/0243506 | A1 | 8/2022 | Moriyama | |
| 2022/0268063 | A1 | 8/2022 | Vrsecký | |
| 2022/0282533 | A1 | 9/2022 | Schütz | |
| 2022/0341226 | A1 | 10/2022 | Sobecki | |
| 2022/0372798 | A1 | 11/2022 | Gröver | |
| 2022/0381080 | A1 * | 12/2022 | Vlk | B60L 53/16 |
| 2023/0258029 | A1 | 8/2023 | Philippe | |
| 2023/0265707 | A1 | 8/2023 | Alneri | |
| 2023/0340812 | A1 * | 10/2023 | Rudolf | E05B 85/103 |
| 2023/0349219 | A1 | 11/2023 | Zhao | |
| 2023/0417090 | A1 | 12/2023 | Guerin | |
| 2024/0093537 | A1 | 3/2024 | Wilke | |
| 2024/0125154 | A1 | 4/2024 | Peterson | |
| 2024/0246409 | A1 | 7/2024 | Zerbe | |
| 2024/0418018 | A1 | 12/2024 | Zhou | |

FOREIGN PATENT DOCUMENTS

| | | | | | |
|---|---|---|---|---|---|
| CN | 206826767 | U | * | 1/2018 | B60K 15/05 |
| CN | 108843162 | A | | 11/2018 | |
| CN | 108979368 | A | | 12/2018 | |
| CN | 109477347 | A | | 3/2019 | |
| CN | 209723950 | U | | 12/2019 | |
| CN | 210732313 | U | | 6/2020 | |
| CN | 211549234 | U | | 9/2020 | |
| CN | 112443217 | A | | 3/2021 | |
| CN | 113090142 | A | | 7/2021 | |
| CN | 115538871 | A | | 12/2022 | |
| DE | 3625484 | A | * | 2/1988 | E05D 15/582 |
| DE | 4242228 | C2 | * | 12/1995 | E05D 15/42 |
| DE | 19642687 | A1 | | 4/1998 | |
| DE | 19919251 | A1 | | 11/2000 | |
| DE | 69803826 | T2 | | 11/2002 | |
| DE | 10249703 | A1 | | 5/2004 | |
| DE | 19740827 | B4 | | 6/2006 | |
| DE | 102008019335 | A1 | | 10/2008 | |
| DE | 102011017240 | A1 | | 12/2011 | |
| DE | 102010053137 | A1 | | 6/2012 | |
| DE | 10128866 | B4 | | 8/2012 | |
| DE | 102013212083 | A1 | | 1/2014 | |
| DE | 102012020710 | A1 | | 4/2014 | |
| DE | 102013016885 | A1 | | 6/2014 | |
| DE | 202014101216 | U1 | | 5/2015 | |
| DE | 102014103642 | A1 | | 8/2015 | |
| DE | 102014109738 | A1 | | 12/2015 | |
| DE | 102015209852 | A1 | | 12/2016 | |
| DE | 102016112423 | A1 | | 1/2017 | |
| DE | 202016100445 | U1 | * | 5/2017 | B60K 15/05 |
| DE | 202017104635 | U1 | | 10/2017 | |
| DE | 102016109933 | A1 | | 11/2017 | |
| DE | 102016110869 | A1 | | 12/2017 | |
| DE | 102017008108 | A1 | | 1/2018 | |
| DE | 102017101247 | A1 | | 7/2018 | |
| DE | 102017210117 | A1 | | 12/2018 | |
| DE | 102017212397 | A1 | | 1/2019 | |
| DE | 202019103205 | U1 | | 7/2019 | |
| DE | 102018109474 | A1 | | 10/2019 | |
| DE | 102017124368 | B4 | | 3/2020 | |
| DE | 102018128972 | A1 | | 5/2020 | |
| DE | 102017212397 | B4 | * | 9/2020 | B60K 15/05 |
| DE | 102019106436 | A1 | | 9/2020 | |
| DE | 102019206282 | A1 | | 11/2020 | |
| DE | 202021001685 | U1 | | 6/2021 | |

(56) References Cited

FOREIGN PATENT DOCUMENTS

| | | | | | |
|---|---|---|---|---|---|
| DE | 102020106168 | A1 | | 9/2021 | |
| DE | 102020117046 | B3 | | 9/2021 | |
| DE | 102020113492 | A1 | | 11/2021 | |
| DE | 102020209655 | A1 | | 2/2022 | |
| DE | 102020130235 | A1 | | 5/2022 | |
| DE | 102022105502 | A1 | | 9/2022 | |
| DE | 102021002425 | A1 | | 11/2022 | |
| DE | 202022104963 | U1 | | 12/2022 | |
| DE | 102017126077 | B4 | | 1/2023 | |
| DE | 102021134396 | A1 | * | 6/2023 | ............. B60K 15/05 |
| DE | 202023104889 | U1 | | 11/2023 | |
| DE | 102020209607 | A1 | | 12/2023 | |
| DE | 102022115229 | A1 | * | 12/2023 | ............. B60K 15/05 |
| DE | 102020209609 | A1 | | 2/2024 | |
| DE | 202024100401 | U1 | | 2/2024 | |
| DE | 202024100582 | U1 | | 3/2024 | |
| DE | 202024100584 | U1 | | 3/2024 | |
| DE | 102023118359 | A1 | | 1/2025 | |
| EP | 0681075 | A2 | | 11/1995 | |
| EP | 1081319 | A1 | | 3/2001 | |
| EP | 1186734 | A1 | | 3/2002 | |
| EP | 1402138 | B1 | | 11/2005 | |
| EP | 1944436 | A2 | | 7/2008 | |
| EP | 2032782 | B1 | | 8/2010 | |
| EP | 2032783 | B1 | | 8/2010 | |
| EP | 2259984 | A1 | | 12/2010 | |
| EP | 3122967 | A1 | | 2/2017 | |
| EP | 2808467 | B1 | | 3/2017 | |
| EP | 2663705 | B1 | | 7/2017 | |
| EP | 3421701 | A1 | | 1/2019 | |
| EP | 3421702 | A1 | | 1/2019 | |
| EP | 3426869 | A1 | | 1/2019 | |
| EP | 2775076 | B1 | | 9/2019 | |
| EP | 3620599 | A1 | | 3/2020 | |
| EP | 2646277 | B1 | | 4/2020 | |
| EP | 3712362 | A1 | | 9/2020 | |
| EP | 3734002 | A1 | | 11/2020 | |
| EP | 3803007 | A1 | | 4/2021 | |
| EP | 3322870 | B1 | | 10/2021 | |
| EP | 3430217 | B1 | | 1/2022 | |
| EP | 3681750 | B1 | | 4/2022 | |
| EP | 4019312 | A1 | | 6/2022 | |
| EP | 4258312 | A2 | | 10/2023 | |
| FR | 3034802 | A1 | | 10/2016 | |
| FR | 3054582 | A1 | | 2/2018 | |
| FR | 3071861 | A1 | | 4/2019 | |
| FR | 3096713 | A1 | | 12/2020 | |
| JP | S629655 | U | | 1/1987 | |
| JP | 2003276516 | A | * | 10/2003 | ............. B60K 15/05 |
| JP | 2019027076 | A | | 2/2019 | |
| JP | 2019090196 | A | | 6/2019 | |
| KR | 100931160 | B1 | | 12/2009 | |
| WO | 9952727 | A1 | | 10/1999 | |
| WO | 0034604 | A1 | | 6/2000 | |
| WO | 0208550 | A2 | | 1/2002 | |
| WO | 0229184 | A1 | | 4/2002 | |
| WO | WO-2009114418 | A1 | * | 9/2009 | ............. B60K 15/05 |
| WO | 2011047649 | A1 | | 4/2011 | |
| WO | 2012021782 | A2 | | 2/2012 | |
| WO | 2012151403 | A1 | | 11/2012 | |
| WO | 2015114154 | A2 | | 8/2015 | |
| WO | WO-2015114155 | A1 | * | 8/2015 | ............. B60K 15/05 |
| WO | 2015144526 | | | 10/2015 | |
| WO | 2016077068 | A1 | | 5/2016 | |
| WO | 2017211500 | A1 | | 12/2017 | |
| WO | 2018219268 | A1 | | 12/2018 | |

* cited by examiner

ACTUATING MECHANISM FOR ACTUATING COVERS FOR VEHICLES

RELATED APPLICATION

The present application claims the benefit of German Patent Application No. 10 2022 120 728.5, filed Aug. 17, 2022, the contents of which are hereby incorporated by reference.

BACKGROUND

The present disclosure relates to an actuating mechanism for actuating covers for vehicles, more particularly covers for charging, service, or filling flaps. Further aspects of the present disclosure relate to a charging, service, or filling assembly with such an actuating mechanism, as well as a vehicle with the charging, service, or filling assembly.

Movable covers are used at various locations in the vehicle. In principle, these serve to conceal or cover an opening or surface to be covered in or on a vehicle. In particular, such covers are used for filling, charging, water or other service flaps, for example. For example, filling or charging flaps cover a filling recess (or charging recess) used for refueling a vehicle with fuel or, for example, a urea solution, or for charging the battery of an electric or hybrid motor vehicle. Such covers are typically connected to a hinge arm of an actuating mechanism, which forms the corresponding flap that can be pivoted between an open position that uncovers the opening and a closed position that covers the opening.

Known actuating mechanisms can be designed to move the covers in various ways between the closed position and the open position. For example, actuating mechanisms that pivot the cover outward are known. Other actuating mechanisms move the cover behind the outer shell of the vehicle and thus uncover the opening. The required motion patterns of covers are becoming more and more complicated, for technical and esthetic reasons. It follows that the corresponding actuating mechanisms are also becoming larger and more expensive.

Based on the above-mentioned problem, the present disclosure is based on the task of specifying an actuating mechanism which enables complex patterns of motion of the covers with a simple design. In particular, the operating mechanism of the present disclosure is intended to enable the cover to be moved behind the outer shell in a simple manner.

SUMMARY

The present disclosure relates generally to an actuating mechanism, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
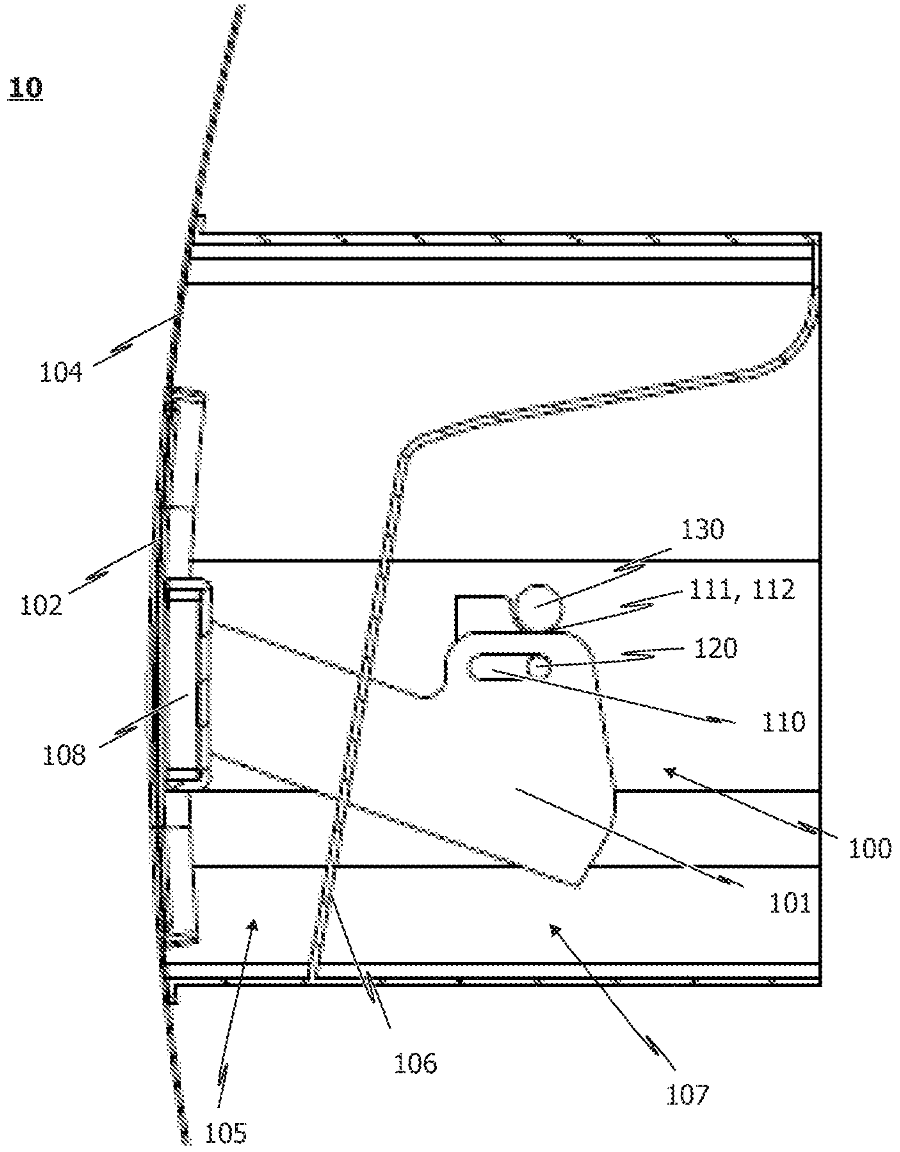
FIG. 1 illustrates a schematic cross-section through the outer shell of a vehicle with a charging, service, or filling assembly in accordance with an embodiment of the present disclosure, in the closed position.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Accordingly, the present disclosure relates to an actuating mechanism for actuating covers for vehicles, in particular covers for charging, service, or filling flaps, the cover being reversibly movable and, in particular, able to pivot between a closed position, in which the cover is arranged, in particular, so that it is flush with an outer shell of the vehicle, and an open position, in which the cover is arranged behind the outer shell, the actuating mechanism comprising the following: a drive, in particular in the form of an electric motor, with a drive shaft; and at least one lever arm which can be connected to the cover, in particular at its back, and is designed to pick up a rotary motion from the drive shaft when the drive is actuated and convert this into a motion, in particular a displacement and pivoting motion, of the cover, wherein the lever arm comprises a drive surface that communicates with the drive shaft, such that the motion of the drive shaft is transmitted to the lever arm via the drive surface, the lever arm comprises a drive surface that communicates with the drive shaft such that a rotation of the drive shaft is transmitted to the lever arm via the drive surface, wherein the drive surface comprises a first region that is configured such that a rotation of the drive shaft moves the lever arm in a first direction when the lever arm communicates with the drive shaft via the first region, and wherein the drive surface comprises a second region that is designed such that a rotation of the drive shaft moves the lever arm in a second direction when the lever arm communicates with the drive shaft via the second region, when the lever arm is in communication with the drive shaft via the second region.

The advantages of the present disclosure are evident. Thus, different directions of motion of the lever arm can be controlled by the different regions of the drive surface. In particular, the first region may be substantially linearly formed, thereby achieving a translational displacement of the lever arm and the cover that is connected to it. The second region may be arc-shaped and used to pivot the lever arm and the cover that is connected to it. Thereby the novel actuating mechanism may achieve a sliding and pivoting motion of the cover in order to move it between its closed position and its open position. In particular, the translational sliding motion and the pivoting motion may be consecutive. Thereby the cover can first be moved into the interior of the outer shell, e.g., during opening, and the flap is then pivoted over the lever arm.

According to a further embodiment, the first region is arranged adjacent to the second region. Accordingly, the sliding motion directly transitions into the pivoting motion. In other words, the lever arm is displaced until a drive means (for example, a gear wheel) has reached an end of the linear range. From this point on, the drive means engages with the arc-shaped region of the drive surface, so that the lever arm and the cover associated therewith are now pivoted. The same applies to the motion from the open position to the closed position. In this case, a pivoting motion over the arc-shaped region is first achieved, after which the cover is transferred to the closed position by sliding over the linear region of the drive surface.

According to a further embodiment, the drive surface is designed as a toothed rack, which is connected to a gear wheel that is driven by the drive shaft. This results in a particularly reliable transfer of the rotational energy provided by the drive shaft to the lever arm. Accordingly, the toothed rack comprises a linear region and an arc-shaped region, over which the gear wheel moves consecutively. The gear wheel remains at the same location in particular, whereby only the toothed rack and thereby the lever arm moves in relation to the outer shell. Of course, it is also conceivable to form the drive surface differently, for example using a surface with a high coefficient of friction (such as rubber), which interacts with a drive wheel that has a high coefficient of friction.

According to a further embodiment, the lever arm comprises a guide groove, in particular an elongated hole, which extends parallel to a sliding direction of the cover. The guide groove ensures that the lever arm can be translationally shifted while the rotational energy of the drive shaft is transferred to the lever arm via the linear region of the drive surface. While the drive shaft is in communication with the arc-shaped region of the drive surface, an end stop of the guide groove serves as a pivot bearing around which the lever arm can be pivoted.

According to a further embodiment, the actuating mechanism comprises a pivot axis around which the lever arm is mounted in a manner that enables it to pivot, wherein the pivot axis extends within the guide groove. The pivot arm according to this embodiment may perform a dual function. In particular, it serves to laterally guide the lever arm during the sliding motion. During the pivoting motion, the pivot axis additionally serves as the axis of rotation for the lever arm.

According to a further embodiment, the lever arm comprises an end stop which is arranged adjacently to the arc-shaped region, in particular on a side of the lever arm that is located opposite the linear region. Accordingly, the lever arm can be used not only as a drive surface for two different modes of motion; rather, the lever arm itself can limit the pivoting motion, so that the open position is easily achieved by a repeatable process.

According to a further embodiment, the lever arm is formed in one piece.

A further aspect of the present disclosure relates to a charging, service, or filling assembly for vehicles, wherein the charging, service, or filling assembly comprises the following: an indentation, in particular a charging, servicing, or filling indentation; a cover for covering the indentation, wherein the cover is reversibly movable and in particular able to pivot between a closed position, in which the cover is arranged so that it is flush with an outer shell of the vehicle, and an open position, in which the cover is arranged behind the outer shell; and an actuating mechanism as described above, wherein the drive shaft and/or the drive surface is/are arranged behind the indentation.

The charging, service, or filling assembly according to the present disclosure comprises an indentation with charging or filling connectors (for example, electrical charging plugs), which may be attached to an inner side of the outer shell of the vehicle, for example. By placing the cover in its open position, the charging or filling modules become accessible. The indentation also protects an interior region of the vehicle shell from weather influences. According to the present disclosure, the drive shaft and/or the drive surface of the actuating mechanism are arranged behind the indentation, and are thus also protected from weather influences. Herein, only part of the lever arm can extend through the indentation to connect it to the cover.

According to a further embodiment, the indentation comprises an elongated hole to guide a pivoting motion of the lever arm.

According to another aspect, the present disclosure concerns a vehicle with a charging, service, or filling assembly as described above.

The disclosure will be described in further detail below with respect to the embodiments shown in the figures.

FIG. 1 is a schematic cross-section through an outer shell of a vehicle with a charging, service, or filling assembly 10 in accordance with an embodiment of the present disclosure. The charging, service, or filling assembly 10 comprises a cover 102 which is shown in FIG. 1 in its closed position. In the closed position, the cover 102 is, in particular, flush with an outer shell 104 of a vehicle. The cover can be moved between the closed position shown in FIG. 1 and an open position shown in FIG. 4 via an actuating mechanism 100.

The actuating mechanism 100 comprises a lever arm 101. The lever arm 101 is connected to a cover 102 at a first end.

It is noted that only one lever arm 101 can be seen in FIG. 1. However, it is preferably contemplated that the actuating mechanism 100 comprises two substantially identical lever arms, which are attached to opposite sides of the cover 102. Herein, the two lever arms can be connected to each other and to the cover 102 via a synchronization element 108.

The lever arm 101 comprises a drive surface 111. The drive surface 111 is arranged at a second end of the lever arm 101, which is located substantially opposite the first end. The drive surface 111 is arranged on an outer surface of the lever arm 101. The drive surface 111 is in contact with a drive gear 130, for example a gear wheel. The drive gear 130 is driven by a drive shaft of a drive, particularly an electric motor, not shown herein. The drive gear 130 may, in particular, be rotated clockwise and counterclockwise.

The lever arm 101 further comprises a guide groove 110, which is formed as an elongated hole. A pivot axis 120 is received in the guide groove 110. In the closed position shown in FIG. 1, the pivot axis 120 is arranged at a first end of the guide groove. The lever arm 101 can be translationally moved in relation to the pivot axis 120 via the guide groove 110.

The actuating mechanism 100 is received within the outer shell 104. An indentation 106 is provided on the inner side of the outer shell 104, and serves to receive charging or filling modules (for example, charging plugs or filling openings). The indentation 106 divides the interior of the outer shell of the vehicle into an outer region 105 and an inner region 107. The outer region 105 is accessible from the exterior of the vehicle when the cover 102 (for example, FIG. 4) is open. The interior region 107 is not accessible from the outside, regardless of whether the cover 102 is open or closed.

As can be seen in FIG. 1, the drive, the pivot axis, and the drive surface are located behind the indentation 106, that is, within the interior region 107. Only a front portion of the lever arm 101 which is connected to the cover 102 via the first end extends through corresponding openings of the indentation 106, for example through elongated holes of the indentation 106. Thereby the drive parts of the actuating mechanism 100 according to the disclosure are protected from weather influences by the indentation 106.

The drive surface 111 comprises a linear region 112. The linear region 112 specifically extends parallel to the guide groove 110. The linear region 112 is in contact with the drive wheel 130 in the closed position of the cover 102 as shown in FIG. 1. Accordingly, as a result of the counterclockwise motion of the drive wheel 130, a corresponding linear displacement of the lever arm and therefore the cover 102 into the outer skin 104 takes place. The length of the linear region 112 is in particular adapted to the length of the guide groove 110. In particular, the linear region 112 is substantially of the same length or longer than the length of the guide groove 110.

When rotating the drive wheel 130 counterclockwise in FIG. 1, the lever arm 101 is translationally shifted inward in relation to the pivot axis 120.

Figure 2:
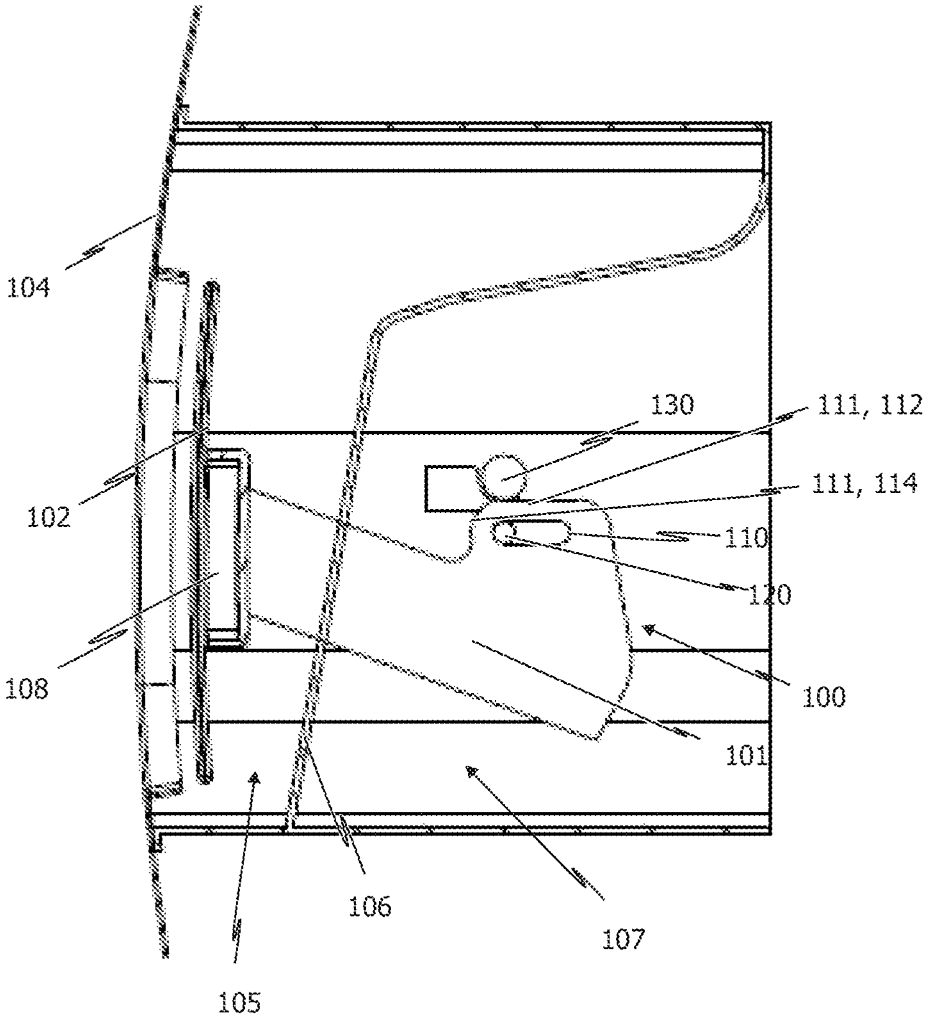
FIG. 2 illustrates a cross-section according to FIG. 1, after the sliding motion has been completed.

An end of the translational sliding motion of the lever arm 101 due to the drive wheel 130 is shown in FIG. 2. In FIG. 2, the lever arm 101 and thereby the cover 102 has been displaced so far into the outer shell 104 that the pivot arm 120 reaches a second end of the guide groove 110 which is located opposite the first end. In this position, further linear sliding inwards is no longer possible.

The drive surface 111 comprises an arc-shaped region 114. The arc-shaped region 114 is arranged adjacently to the linear region 112. The arc-shaped region according to the embodiment shown in the figures spans an angle of approximately 90°.

Figure 3:
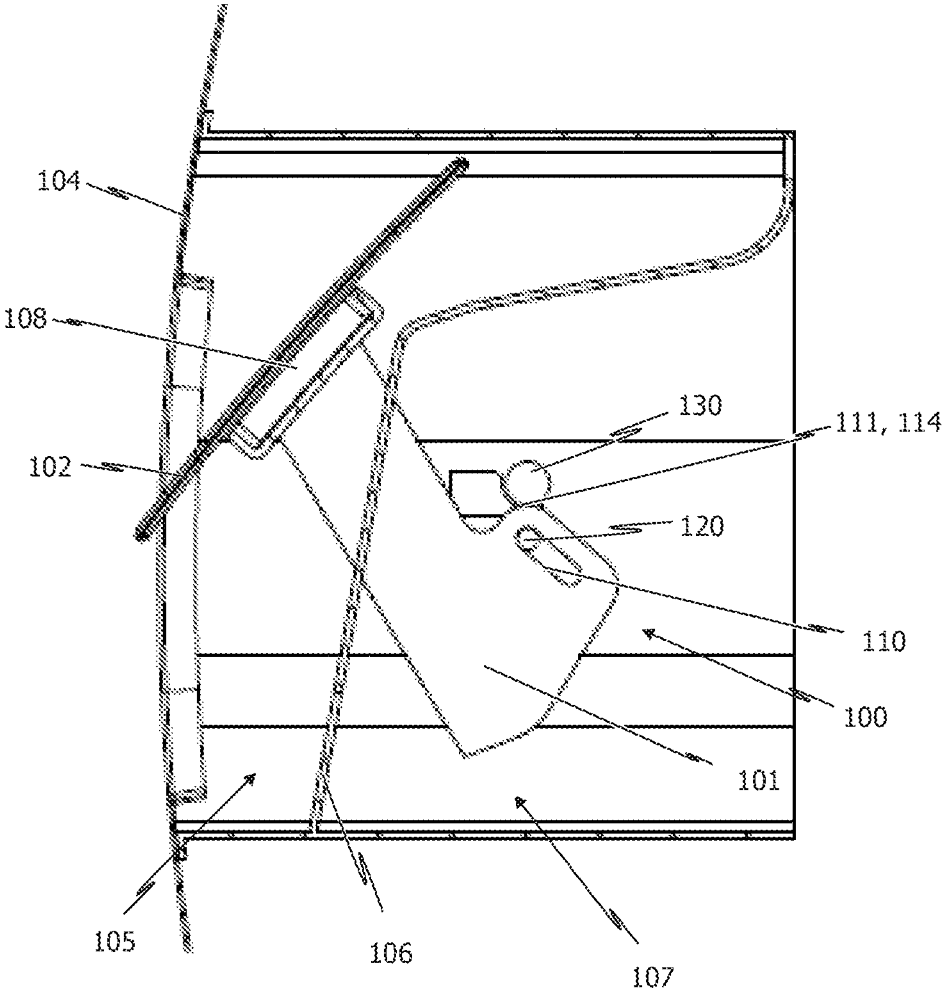
FIG. 3 illustrates a cross section according to FIG. 1, during the pivoting motion.

In the end position of linear motion shown in FIG. 2, the drive wheel 130 comes into contact with the arc-shaped region 114 of the drive surface 111. In other words, the rotational energy of the drive shaft is transferred from the position shown in FIG. 2 to the arc-shaped region 114 of the lever arm 101 via the drive wheel 130. In a further rotation of the drive wheel 130 in the counterclockwise direction, the arc-shaped region is traversed by the drive wheel 110. This achieves the pivoting motion of the lever arm 101. In particular, the lever arm 101 is pivoted around the pivot axis 120, as shown, for example, in FIG. 3. In other words, the arc-shaped region 114 is moved through between the pivot axis 110 and the drive wheel 130 during the pivoting motion.

Figure 4:
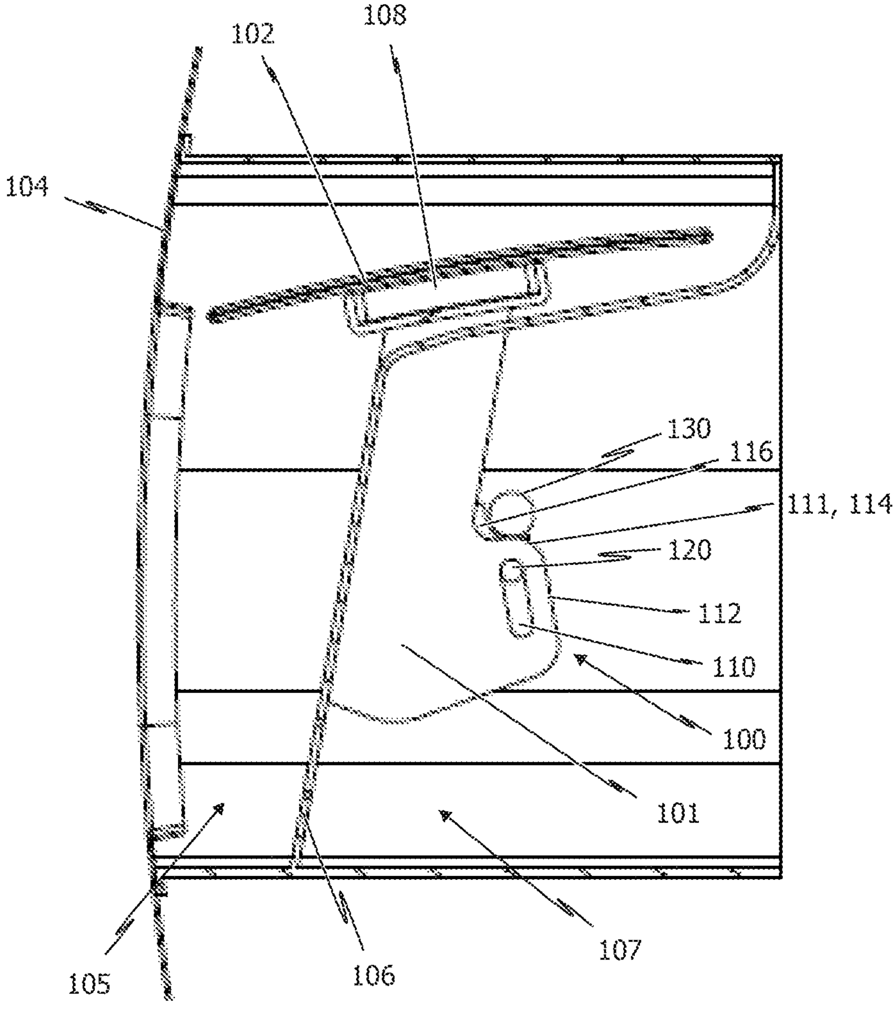
FIG. 4 illustrates a cross section according to FIG. 1, in the open position.

In a further motion of the drive wheel 130 in the counterclockwise direction, the lever arm 101 is further pivoted until it reaches the open position of the cover 102 shown in FIG. 4. In the open position according to FIG. 4, the drive wheel 130 can engage with an end stop 116 of the lever arm. This prevents further pivoting in the opening direction, so that the open position of the cover 120 can be repeatedly achieved. The end stop 116 can be formed by a further arc-shaped region, which, however, is not designed as a drive surface. The arc-shaped end stop 116 is formed in a convex shape, while the arc-shaped region 114 of the drive surface is formed in a concave shape. In other words, the arc-shaped region 114 forms an S-shape with the arc-shaped end stop 116.

By moving the drive wheel clockwise, the lever arm 101, and therefore the cover 102, can be transitioned from the open position shown in FIG. 4 to the closed position shown in FIG. 1. This takes place analogously to the opening motion described above; however, a pivoting motion followed by a sliding motion of the lever arm 101 and therefore the cover 102 takes place herein, until the closed position according to FIG. 1 is reached.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system is not limited to the particular implementations disclosed. Instead, the present method and/or system will include all implementations falling within the scope of the appended claims, both literally and under the doctrine of equivalents.

What is claimed is:

1. An actuating mechanism for actuating a cover of a vehicle, wherein the cover is reversibly movable between a closed position in which the cover is arranged so as to be flush with a vehicle outer skin and an open position in which the cover is arranged behind the outer skin, the actuating mechanism comprising:

a drive having a drive shaft; and at least one lever arm, which is configured to connect to a cover and is configured so as to tap a rotational movement from the drive shaft when the drive is actuated and convert it into a movement of the cover, wherein the lever arm comprises a drive surface on an outer surface of the lever arm, which communicates with the drive shaft such that a rotation of the drive shaft via the drive surface is transferred to the lever arm, wherein the drive surface comprises a first region configured such that a rotation of the drive shaft moves the lever arm in a first direction when the lever arm is in communication with the drive shaft via the first region, wherein the drive surface comprises a second region configured such that a rotation of the drive shaft moves the lever arm in a second direction when the lever arm communicates with the drive shaft via the second region, and wherein the first region is substantially linear and wherein the second region is curvilinear.

2. The actuating mechanism according to claim 1, wherein the first region is arranged adjacently to the second region.

3. The actuating mechanism according to claim 1, wherein the drive surface is configured as a rack, which communicates with a gear wheel driven by the drive shaft.

4. The actuating mechanism according to claim 3, wherein the gear wheel remains stationary and the rack moves relative to the gear wheel.

5. The actuating mechanism according to claim 3, wherein the gear wheel is in contact with the drive surface.

6. The actuating mechanism according to claim 1, wherein the lever arm comprises a guide groove, which is configured so as to guide movement of the lever arm in the first direction and the second direction.

7. The actuating mechanism according to claim 6, wherein the guide groove is configured as an elongated hole extending parallel to the first region of the drive surface.

8. The actuating mechanism according to claim 6, wherein the actuating mechanism comprises a pivot axis, about which the lever arm is pivotally supported, and wherein the pivot axis extends into the guide groove.

9. The actuating mechanism according to claim 1, wherein the lever arm comprises a limit stop, which is arranged adjacently to a curvilinear region on a side of the lever arm opposite a linear region.

10. The actuating mechanism according to claim 1, wherein the lever arm is formed as a single piece.

11. The actuating mechanism according to claim 1, wherein the lever arm is connectable to the cover via a hinge in such a way that the cover is movable relative to the lever arm.

12. The actuating mechanism according to claim 1, wherein the drive shaft is in communication with the first region when the cover is in a closed position.

13. The actuating mechanism of claim 12, wherein the drive shaft is in communication with the second region when the cover is in an open position.

14. A charging, servicing, or tank assembly for a vehicle, comprising:

a cavity;

a cover for covering the cavity, wherein the cover is reversibly movable between a closed position in which the cover is arranged so as to be flush with a vehicle outer skin and an open position in which the cover is arranged behind the outer skin; and an actuating mechanism comprising, a drive having a drive shaft; and at least one lever arm, which is connectable to the cover and is configured so as to tap a rotational movement from the drive shaft when the drive is actuated and convert it into a movement of the cover, the lever arm further comprising a drive surface, which is in contact with a gear wheel such that a rotation of the drive shaft is transferred to the lever arm via the drive surface, wherein the drive surface comprises a first region configured such that a rotation of the drive shaft moves the lever arm in a first direction when the lever arm is in communication with the drive shaft via the first region, wherein the drive surface comprises a second region configured such that a rotation of the drive shaft moves the lever arm in a second direction when the lever arm communicates with the drive shaft via the second region, wherein the drive shaft or the drive surface is arranged behind the cavity, and wherein the lever arm comprises a guide groove for guiding a pivoting movement of the lever arm.

15. A motor vehicle having a charging, servicing, or tank arrangement according to claim 14.

16. The assembly according to claim 14, wherein the drive surface of the actuating mechanism is configured as a rack that engages a gear wheel driven by the drive shaft.

17. The assembly according to claim 14, wherein the guide groove comprises an elongated slot extending parallel to the first region of the drive surface.

18. The assembly according to claim 14, wherein the guide groove is spaced apart from the drive surface.

19. An assembly for a vehicle having a cavity and a cover movable between a closed position in which the cover is flush with a vehicle outer skin and an open position in which the cover is arranged behind the vehicle outer skin, the assembly comprising:

an actuating mechanism configured to move the cover between the closed position and the open position, the actuating mechanism including:

a drive having a drive shaft; and at least one lever arm operatively coupled to the cover and configured to convert rotational movement of the drive shaft into movement of the cover, wherein the lever arm comprises a drive surface in contact with a gear wheel driven by the drive shaft such that rotation of the drive shaft is transferred to the lever arm via the drive surface, wherein the drive surface includes a first region configured to move the lever arm in a first direction upon rotation of the drive shaft and a second region configured to move the lever arm in a second direction upon rotation of the drive shaft, and wherein the lever arm comprises a guide groove configured to guide a pivoting movement of the lever arm.

20. The assembly of claim 19, further comprising a pivot axis about which the lever arm is pivotable, wherein the guide groove receives the pivot axis and constrains movement of the lever arm during the pivoting movement.

* * * * *